United States Patent
Lv et al.

(10) Patent No.: US 12,042,042 B2
(45) Date of Patent: Jul. 23, 2024

(54) SHOE BOX

(71) Applicant: Zhejiang Ant Box Household Products Co., Ltd, Jinhua (CN)

(72) Inventors: Jincan Lv, Jinhua (CN); Weimin Zhou, Jinhua (CN); Jinjie Lv, Jinhua (CN); Beilei Xia, Jinhua (CN)

(73) Assignee: Zhejiang Ant Box Household Products Co., Ltd, Jinhua (CN)

( * ) Notice: Subject to any disclaimer, the term of this patent is extended or adjusted under 35 U.S.C. 154(b) by 0 days.

(21) Appl. No.: 18/299,693

(22) Filed: Apr. 12, 2023

(65) Prior Publication Data

US 2024/0099459 A1 Mar. 28, 2024

(30) Foreign Application Priority Data

Sep. 22, 2022 (CN) .......................... 202222515620.1

(51) Int. Cl.
*A47B 61/04* (2006.01)
(52) U.S. Cl.
CPC .................................. *A47B 61/04* (2013.01)
(58) Field of Classification Search
CPC ........... A47B 61/04; F25D 23/02; E05D 7/00; E05D 5/02; B60J 5/106; E05Y 2900/202; E05Y 2900/204; E05Y 2900/208; E05Y 2900/21; E05Y 2900/212
See application file for complete search history.

(56) References Cited

U.S. PATENT DOCUMENTS

| | | | | |
|---|---|---|---|---|
| 443,350 A | * | 12/1890 | Berners | E05D 15/38 49/197 |
| 479,857 A | * | 8/1892 | Tettelbach | F24C 15/02 312/307 |
| 755,615 A | * | 3/1904 | Chatterton | A47B 87/02 312/109 |
| 1,529,601 A | * | 3/1925 | Lyons | E06B 3/5045 49/260 |
| 1,963,089 A | * | 6/1934 | Henderson | F25D 23/021 49/257 |
| 3,424,222 A | * | 1/1969 | Caulkins | F25D 23/087 160/40 |
| 3,653,158 A | * | 4/1972 | Aue | F25D 23/021 49/421 |
| 3,794,401 A | * | 2/1974 | Dean | A47B 46/005 312/331 |
| 5,172,969 A | * | 12/1992 | Reuter | A47B 96/00 312/328 |

(Continued)

*Primary Examiner* — Ko H Chan
(74) *Attorney, Agent, or Firm* — Jeenam Park

(57) ABSTRACT

The present application provides a shoe box, comprising a box body, the box body comprises a hollow storage cavity, the storage cavity comprises a front opening; a box door, which is configured to close the box body, and the box door has an open state and a closed state; the box body comprises a first driving component for driving the box door to open or close, and the first driving component reciprocates along a depth direction of the storage cavity; the box door is accommodated in the storage cavity, when the box door is in the open state; the box door is stopped by the front opening, when the box door is in the closed state. In the present application, the box door is driven by a first driving component reciprocated along the depth direction of the storage cavity on the box body.

9 Claims, 13 Drawing Sheets

(56) References Cited

U.S. PATENT DOCUMENTS

| | | | | |
|---|---|---|---|---|
| 6,557,958 | B1* | 5/2003 | Motta | E05D 15/42 |
| | | | | 312/319.2 |
| 10,443,281 | B2* | 10/2019 | Luedtke | A47F 3/125 |
| 2006/0163981 | A1* | 7/2006 | Conrad | E06B 3/5045 |
| | | | | 312/323 |
| 2009/0322194 | A1* | 12/2009 | Backhaus | A47B 96/16 |
| | | | | 211/162 |
| 2010/0237653 | A1* | 9/2010 | Rydberg | B60J 5/108 |
| | | | | 160/311 |
| 2019/0110614 | A1* | 4/2019 | Charlier | A47F 10/06 |
| 2019/0128034 | A1* | 5/2019 | Luedtke | E05D 15/00 |
| 2023/0061256 | A1* | 3/2023 | Fries | E06B 3/5045 |

* cited by examiner

SHOE BOX

CROSS-REFERENCE TO RELATED APPLICATIONS

This application claims priority to Chinese Utility Application No. 202222515620.1, filed on Sep. 22, 2022. The disclosures of these applications are incorporated herein for all purposes by reference in their entirety.

TECHNICAL FIELD

The present application belongs to the technical field of daily necessities, and in particular relates to a shoe box.

BACKGROUND

Shoe boxes or cabinets are common household items used to store shoes.

The Chinese patent CN202210268846.8 discloses a shoe cabinet, which comprises a cabinet body, a cabinet door, a placement plate and a control driving component. The cabinet body comprises a cavity and an opening structure, and the lower end of the cabinet door is hingely connected with the lower end of the cabinet body, and the cabinet door covers the opening structure. The inner wall of the cabinet door is provided with a guiding groove, and the placement plate is movably connected with the guiding groove through a push rod, thereby driving the cabinet door to be opened and closed. The control driving component is configured to drive the placement plate into and out of the cavity. The above solution has the following limitations: when installing the shoe cabinet, it is necessary to reserve a space for the cabinet door to turn downwards, which takes up a lot of space and is inconvenient to arranged in narrow places such as small apartments or entrances; at the same time, the user easily collides with the turned-out cabinet door during use, that is, there is a certain potential safety hazard, and it is easy to cause damage to the control driving components.

SUMMARY

Aiming at the defects of the above-mentioned prior art, the purpose of the present application is to provide a shoe box to meet the needs of users.

To achieve the above object, the present application provides a shoe box, comprising:
a box body, the box body comprises a hollow storage cavity, the storage cavity comprises a front opening;
a box door, which is configured to close the box body, and the box door has an open state and a closed state;
the box body comprises a first driving component configured to drive the box door to be opened or closed, and the first driving component reciprocates along a depth direction of the storage cavity;
the box door is accommodated in the storage cavity, when the box door is in the open state; the box door is stopped by the front opening, when the box door is in the closed state.

Preferably, the box body comprises a first switch component for controlling the first driving component, the first switch component comprises a first trigging member and two first trigging switches, wherein when the first driving component drives the box door to be in an open state or a closed state, the first trigging member triggers one of the first trigging switches to close the first driving component; and/or the box door comprises a first guiding structure, the box body comprises a second guiding structure, and the first guiding structure is slidingly matched with the second guiding structure.

Preferably, the box body comprises a top plate and side plates respectively arranged on both sides of the top plate, the top plate is configured for installing the first driving component and the first switch component, and the first guiding structure is arranged on both sides of the box door, the second guiding structure is arranged on an inner wall of the side plate;
when the box door is in an open state, the box door is arranged adjacent to and parallel to the top plate; when the box door is in a closed state, the box door is arranged perpendicular to the top plate.

Preferably, the top plate comprises a top mounting cavity for mounting the first driving component and the first switch component, the first driving component comprises a first reduction motor, a first rotating gear and a first gear rack, and the first gear rack is fixedly arranged in the top mounting cavity, the first reduction motor is connected to an upper end of the box door through a rotating shaft component, and the first reduction motor is configured for driving the first rotating gear to engage with the first gear rack, thereby driving the box door to move;
one side of the first reduction motor extends out of the first trigging member, and the first trigging switches are respectively arranged at two ends of a movement path of the first trigging member.

Preferably, the rotating shaft component comprises a connecting shaft and a connecting sleeve that fit with each other, the connecting shaft is arranged perpendicular to an axial direction of the connecting sleeve, the connecting shaft is configured for connecting the first reduction motor, the connecting sleeve is rotatably connected to a top end of the box door; the top mounting cavity comprises a first cavity surface facing the storage cavity, and the first cavity surface is provided with a first limiting groove, and the connecting shaft is slidingly matched with the first limiting groove.

Preferably, the first guiding structure comprises a first guiding post and a second guiding post, and the second guiding structure comprises a first guiding groove and a second guiding groove respectively matching the first guiding post and the second guiding post;
wherein shape of the first guiding groove is linear, the second guiding groove comprises a straight groove intersecting with the first guiding groove, an outer end of the straight groove is integrally connected with an arc groove, and the arc groove is deflected in a direction away from the first guiding groove; the first guiding groove is arranged horizontally, and an outer end of the arc groove in the second guiding groove is vertically arranged.

Preferably, the box body further comprises a bottom plate, the bottom plate comprises a bottom mounting cavity, and a power supply is provided in the top mounting cavity and/or the bottom mounting cavity, and the power supply is configured to supply power to the first driving component and the first switch component;
the top plate is provided with a plurality of grooves, the grooves are provided with metal tabs, and metal joints capable of electrically connecting the metal tab are protrudingly arranged on the bottom plate, the metal tabs are electrically connected to the first driving component and the first switch component, and the metal joints are electrically connected to the first switch component.

Preferably, it further comprises a supporting plate, a second driving component and a second switch component for controlling the second driving component are arranged in the bottom mounting cavity, and the second driving component is configured to drive the supporting plate into and out of the storage cavity;

the second driving component comprises a second reduction motor, a second rotating gear and a second gear rack, the second reduction motor is fixedly arranged in the bottom mounting cavity, the second gear rack is arranged on the supporting plate, the second reduction motor is configured to drive the second rotating gear to mesh with the second gear rack to drive the supporting plate to move.

Preferably, the second switch component comprises two second trigging members and two second trigging switches; the supporting plate comprises a supporting surface and a loading surface arranged opposite to each other, and the second gear rack and the two second trigging members are respectively arranged along a moving direction of the supporting on the loading surface, the bottom mounting cavity comprises a second cavity surface facing the loading surface, and the second cavity surface is provided with a second limiting groove, and the two second trigging switches are respectively arranged at both ends of the second limiting groove, and the two second triggering members are slidably matched with the second limiting groove;

when the supporting plate slides into the storage cavity, one of the second trigging members triggers the adjacent second trigging switch, and the second driving component is turned off; when the supporting plate slides out of the storage cavity, another second trigging member triggers the adjacent second trigging switch, and the second driving component is turned off.

Preferably, two sides of the supporting plate are respectively provided with a second pulley block, and the bottom plate is provided with a second chute block matching the second pulley block; and/or the bottom plate is provided with a third pulley block, and the loading surface is provided with a third chute block matching the third pulley block.

The beneficial effect of the present application is:

(1) The box door is driven by the first driving component that reciprocates along the depth direction of the storage cavity on the box body, so that the box door has an open state for being stored in the storage cavity, so that the front opening is completely exposed, which is convenient to take. It occupies a small space and avoids collisions with users; at the same time, it realizes automatic opening and closing of the box door, saving time and effort.

(2) By providing the first switch component to control the opening and closing of the first driving component, the structural damage caused by the collision between the box door and the box body during the process of opening and closing the box door is avoided, which is beneficial to prolonging the service life of the product.

(3) The opening and closing process of the box door is stable and smooth, and the efficiency of opening and closing the box door is improved by providing the first guiding structure and the second guiding structure which cooperate with each other on the box door and the box body respectively.

(4) By arranging the first driving component to drive the supporting plate into and out of the storage cavity, it is convenient for the user to put on and take off the shoes directly above the supporting plate without reaching into the cavity to pick and place the shoes, which reduces the steps of picking and placing the shoes, and is more convenient.

(5) By arranging metal tabs and metal joints on the top plate and bottom plate respectively, the shoe boxes have a connection function, and users can freely combine multiple shoe boxes into a shoe cabinet for use according to their needs. It has a wide range of practical scenarios and various combinations.

DETAILED DESCRIPTION

Figure 1:
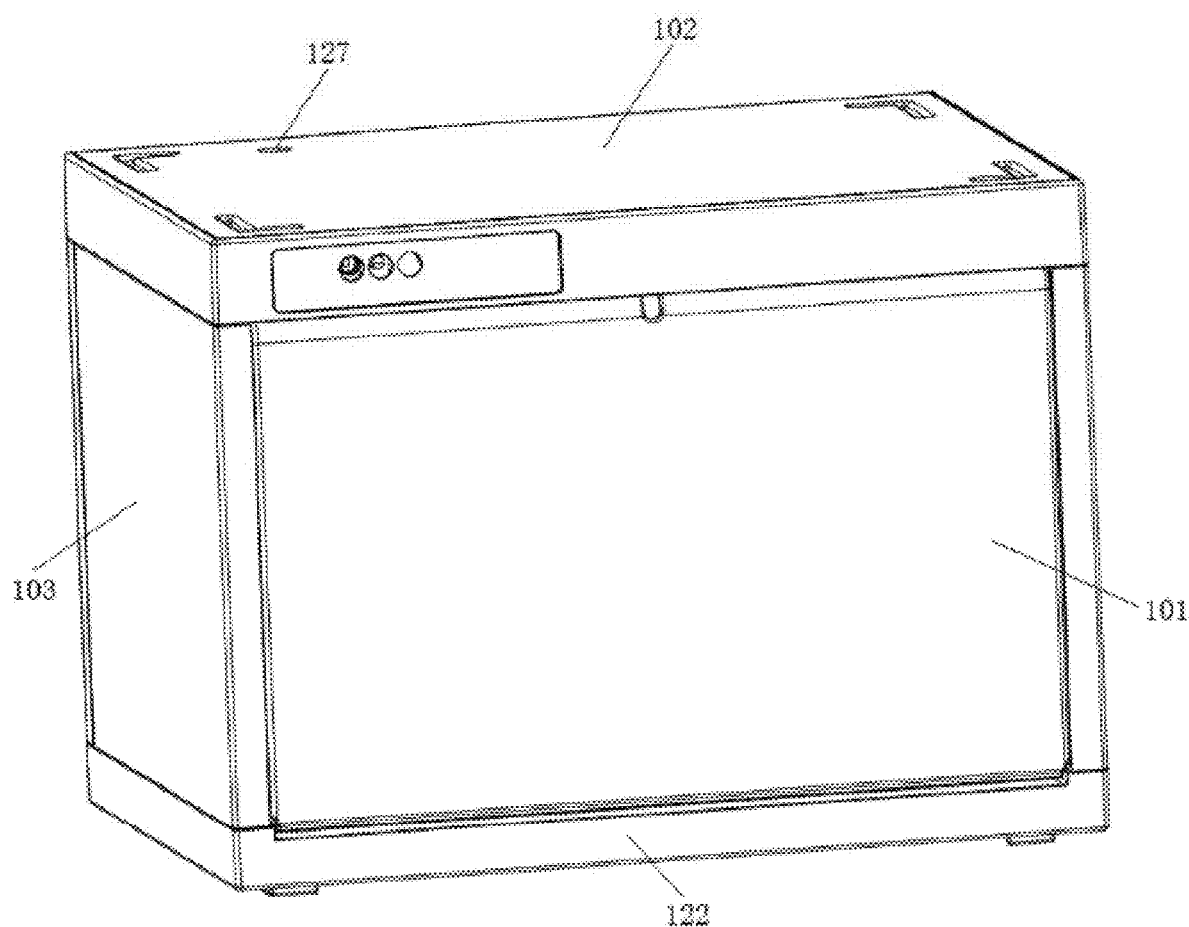
FIG. 1 is a schematic structural diagram of a shoe box provided by this application.
Figure 2:
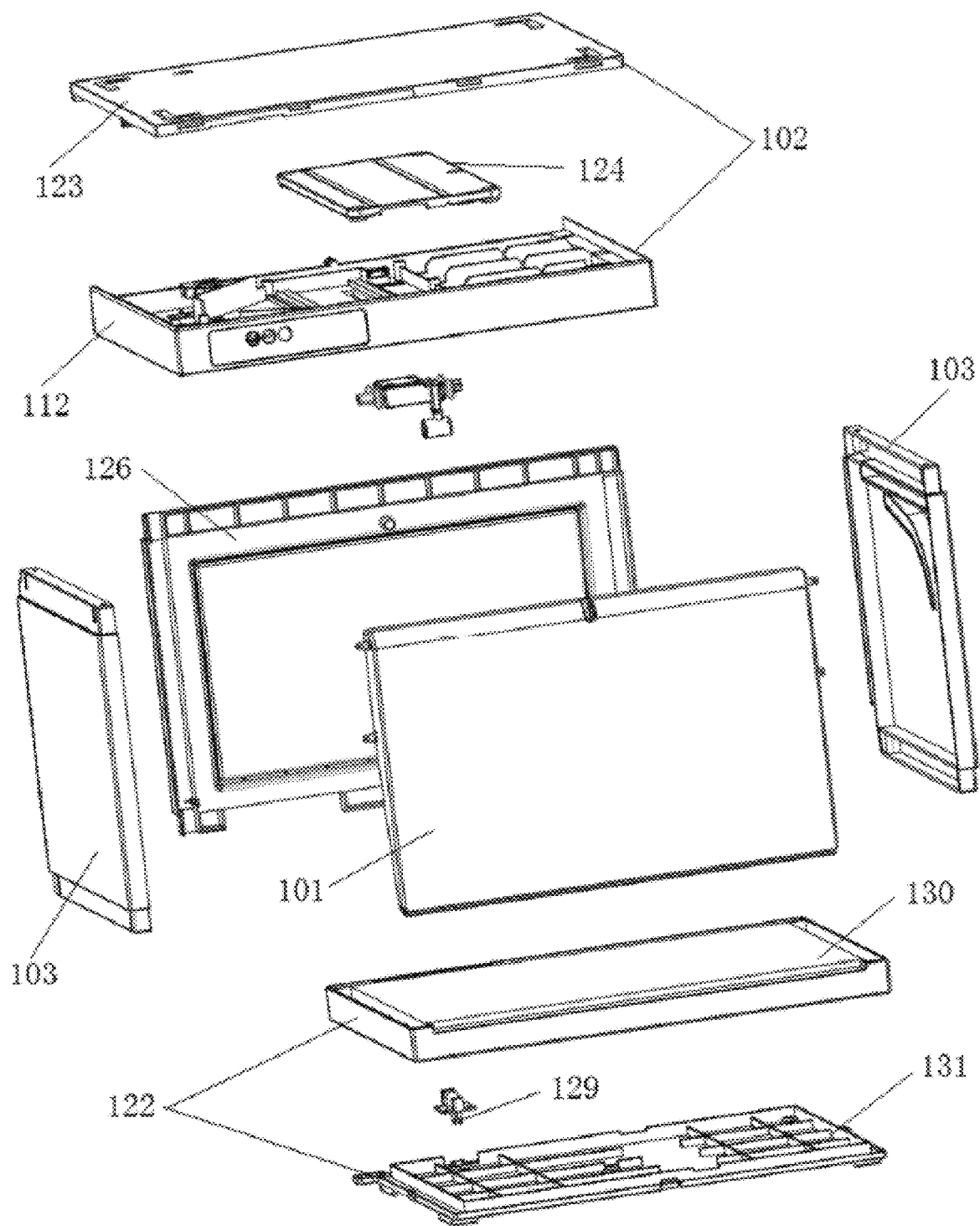
FIG. 2 is a schematic exploded view of a shoebox provided in Embodiment 1.
Figure 3:
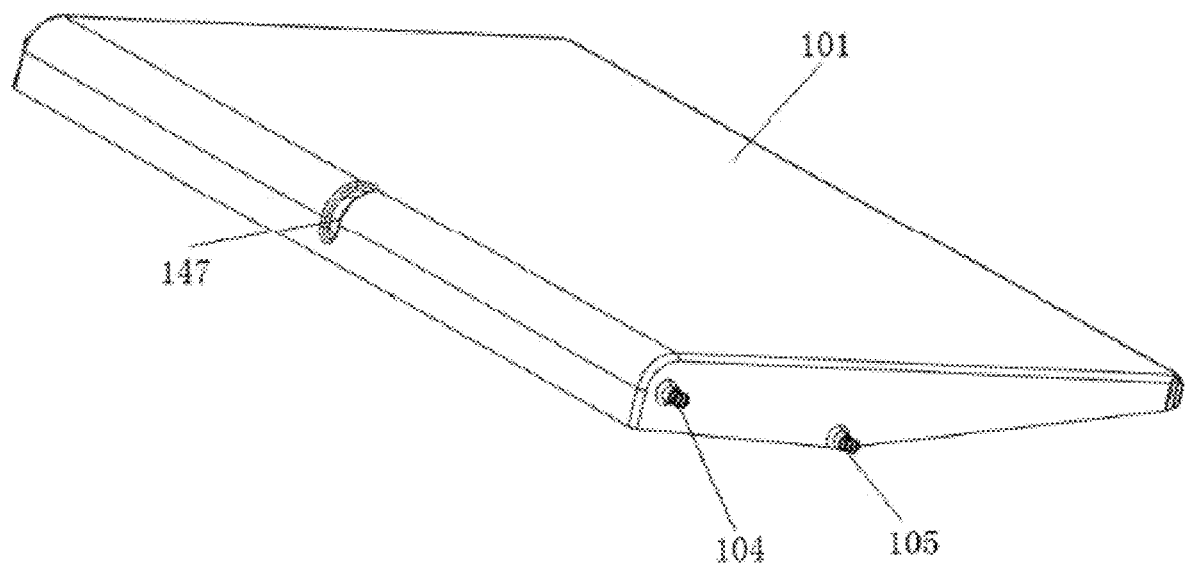
FIG. 3 is a schematic structural diagram of the box door provided in Embodiment 1.
Figure 4:
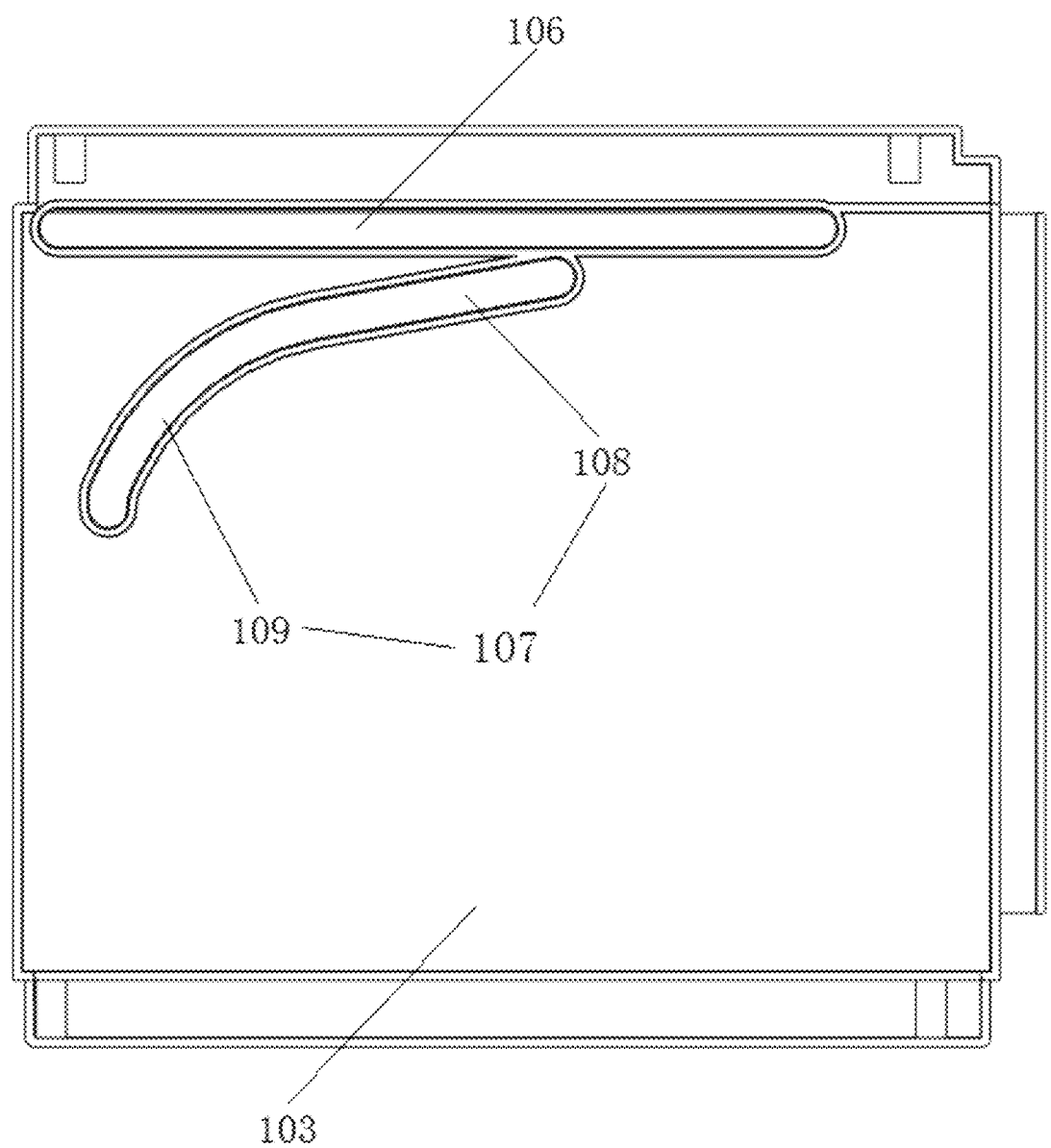
FIG. 4 is a schematic structural diagram of the side plate provided in Embodiment 1.
Figure 5:
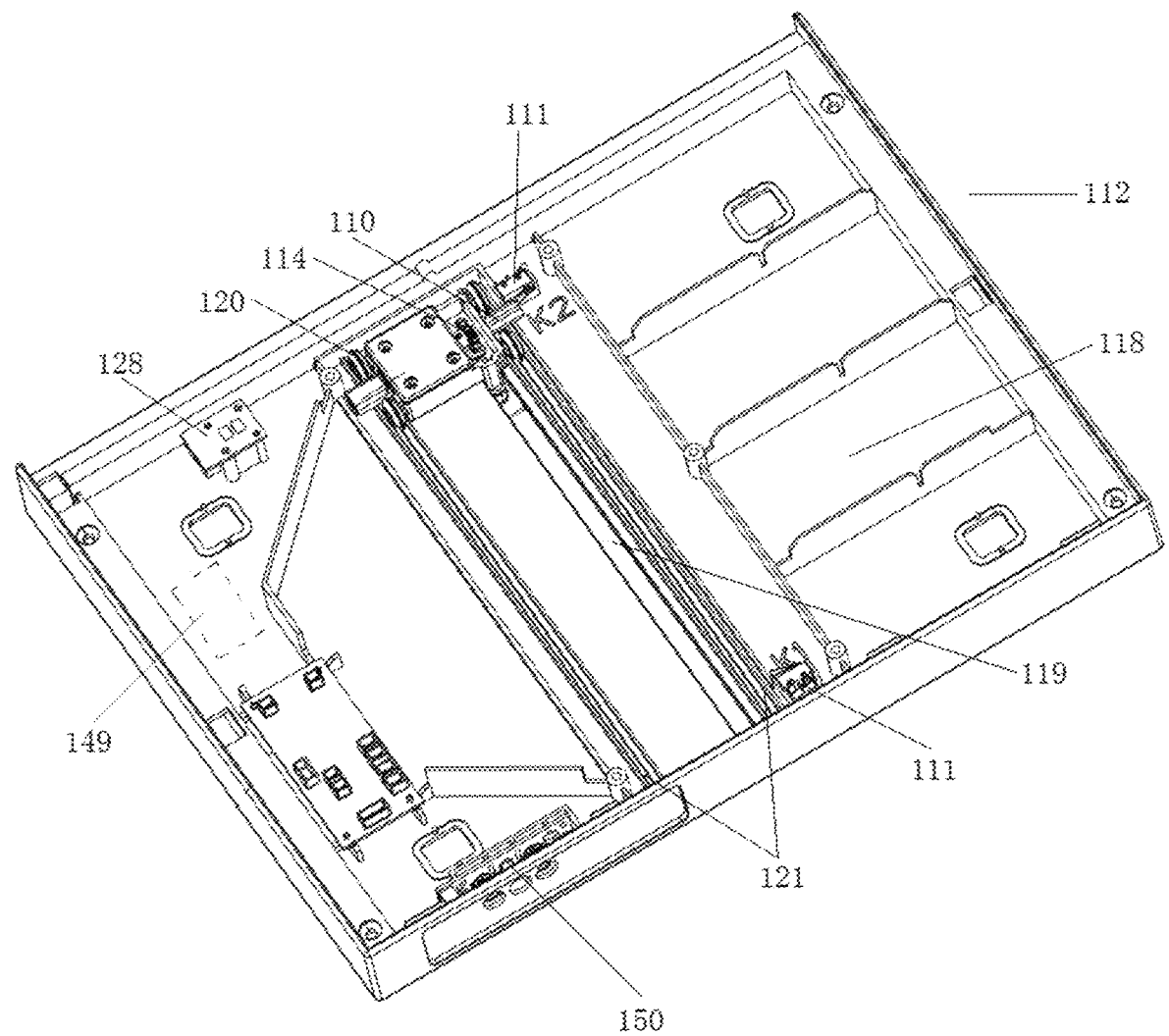
FIG. 5 is a schematic structural diagram of the top mounting cavity provided by Embodiment 1.
Figure 6:
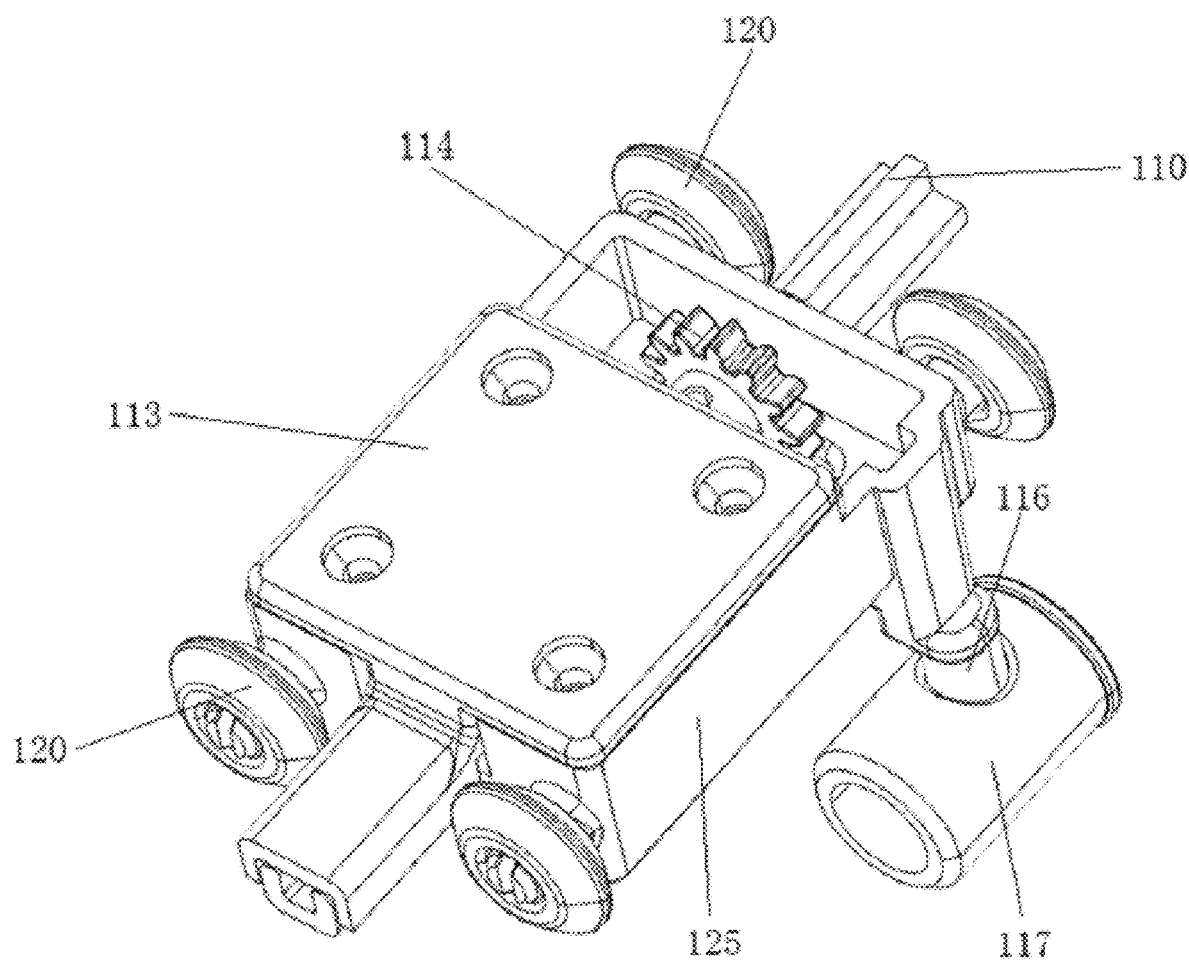
FIG. 6 is a schematic structural diagram of the driving component provided in Embodiment 1.
Figure 7:
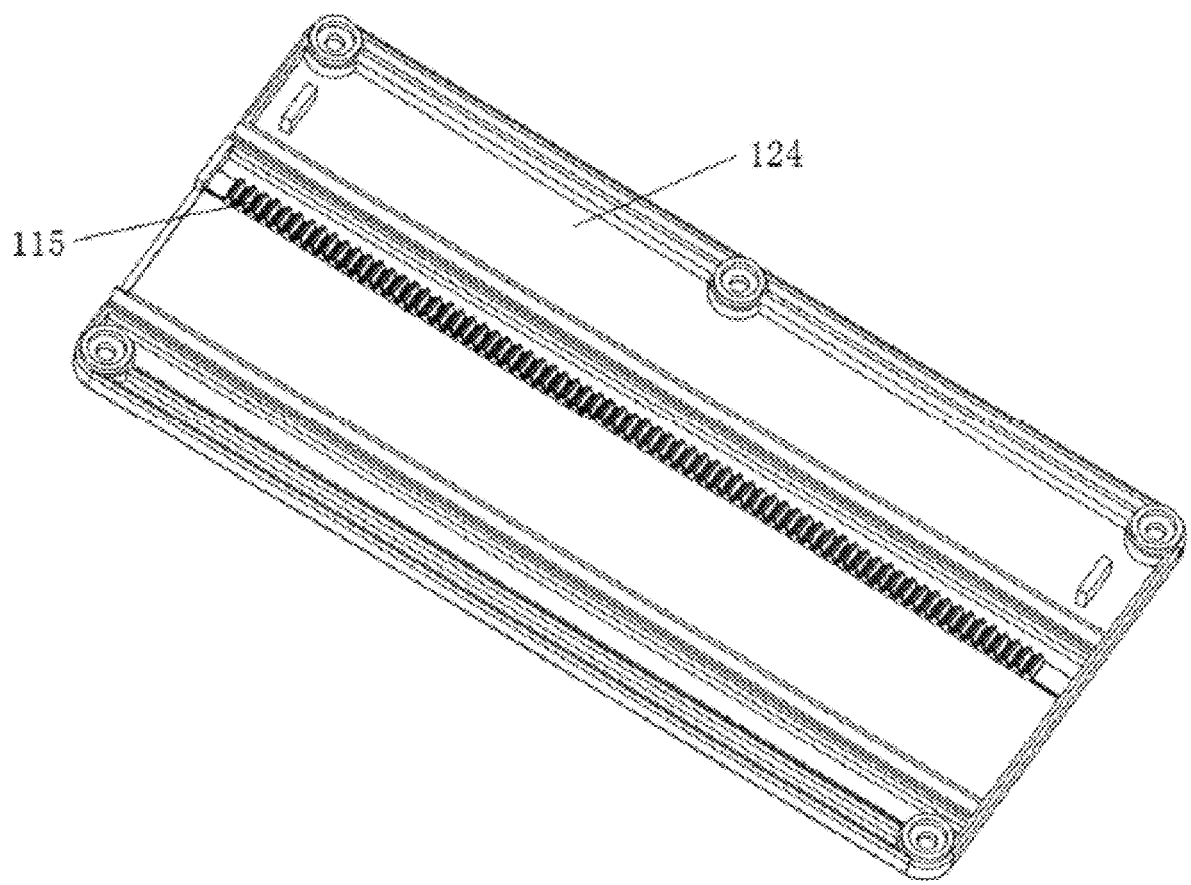
FIG. 7 is a schematic structural diagram of the gear rack plate provided in Embodiment 1.
Figure 8:
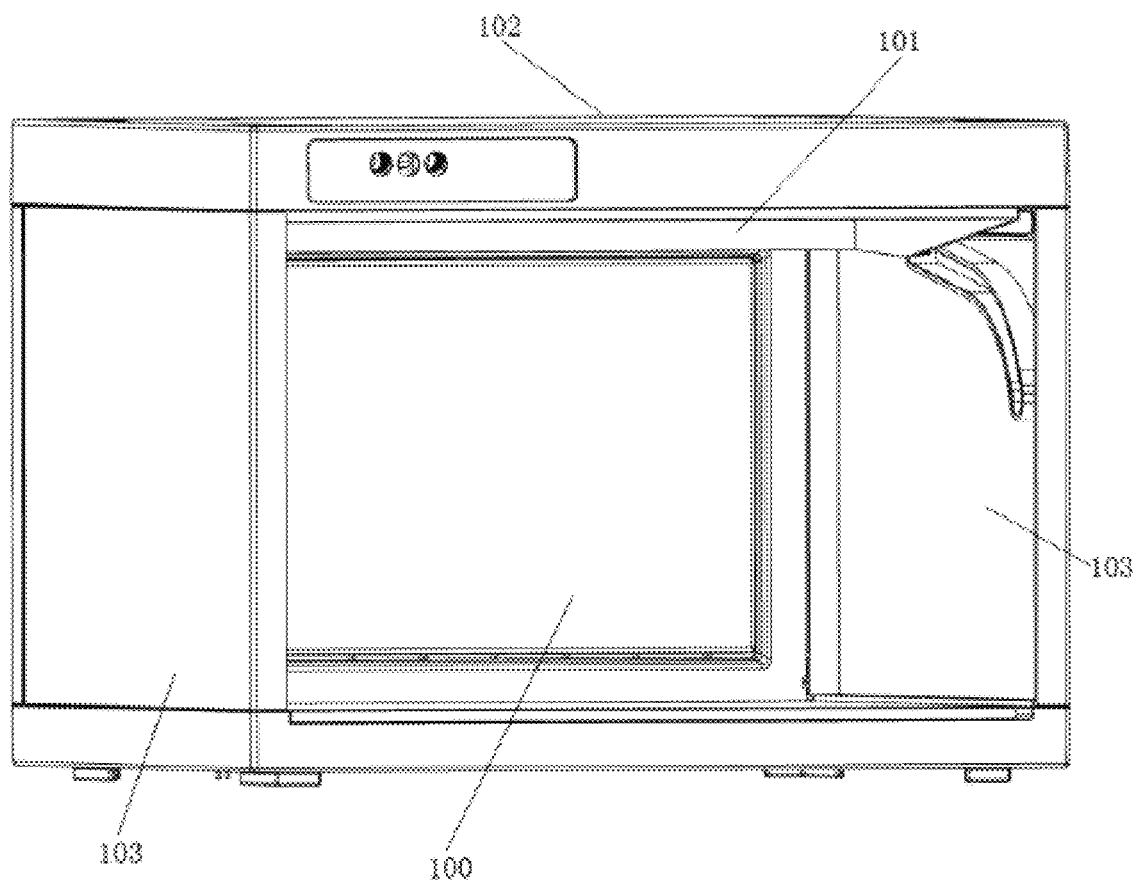
FIG. 8 is a schematic diagram of the open state of the box door provided in Embodiment 1.
Figure 9:
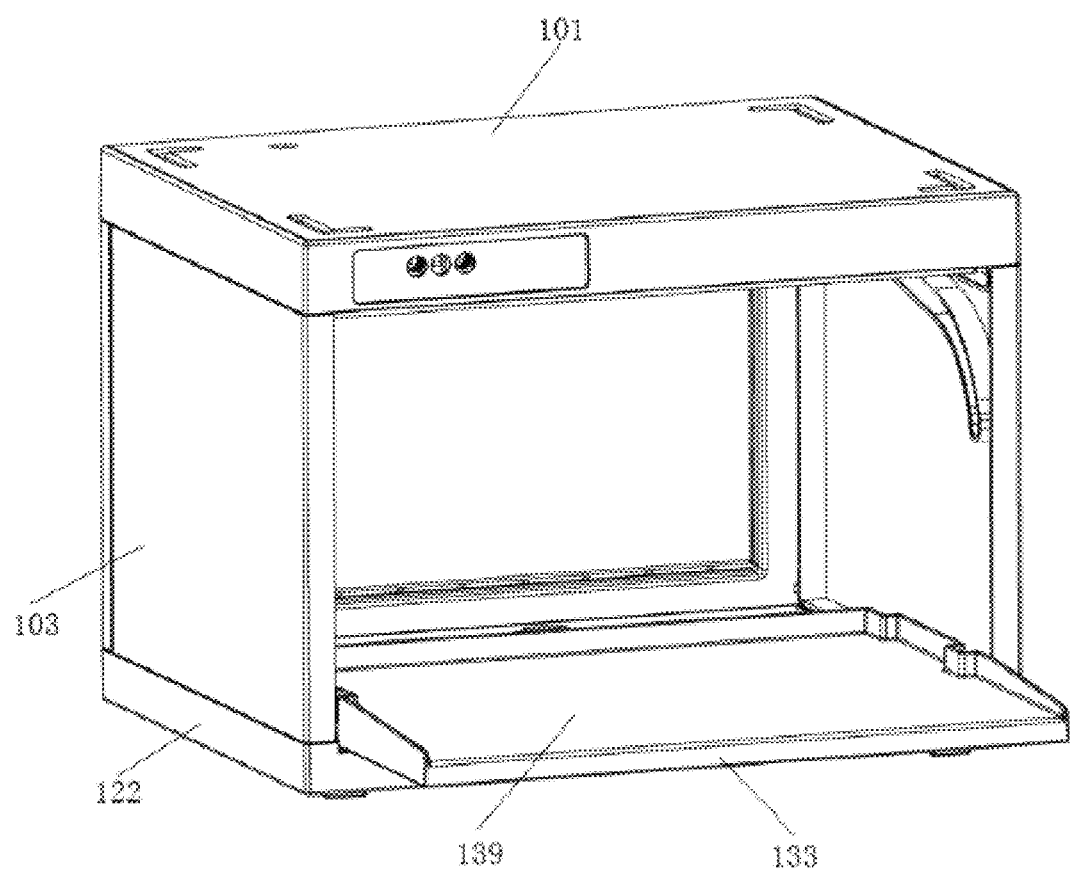
FIG. 9 is a schematic structural view of the shoe box provided in Embodiment 2.
Figure 10:
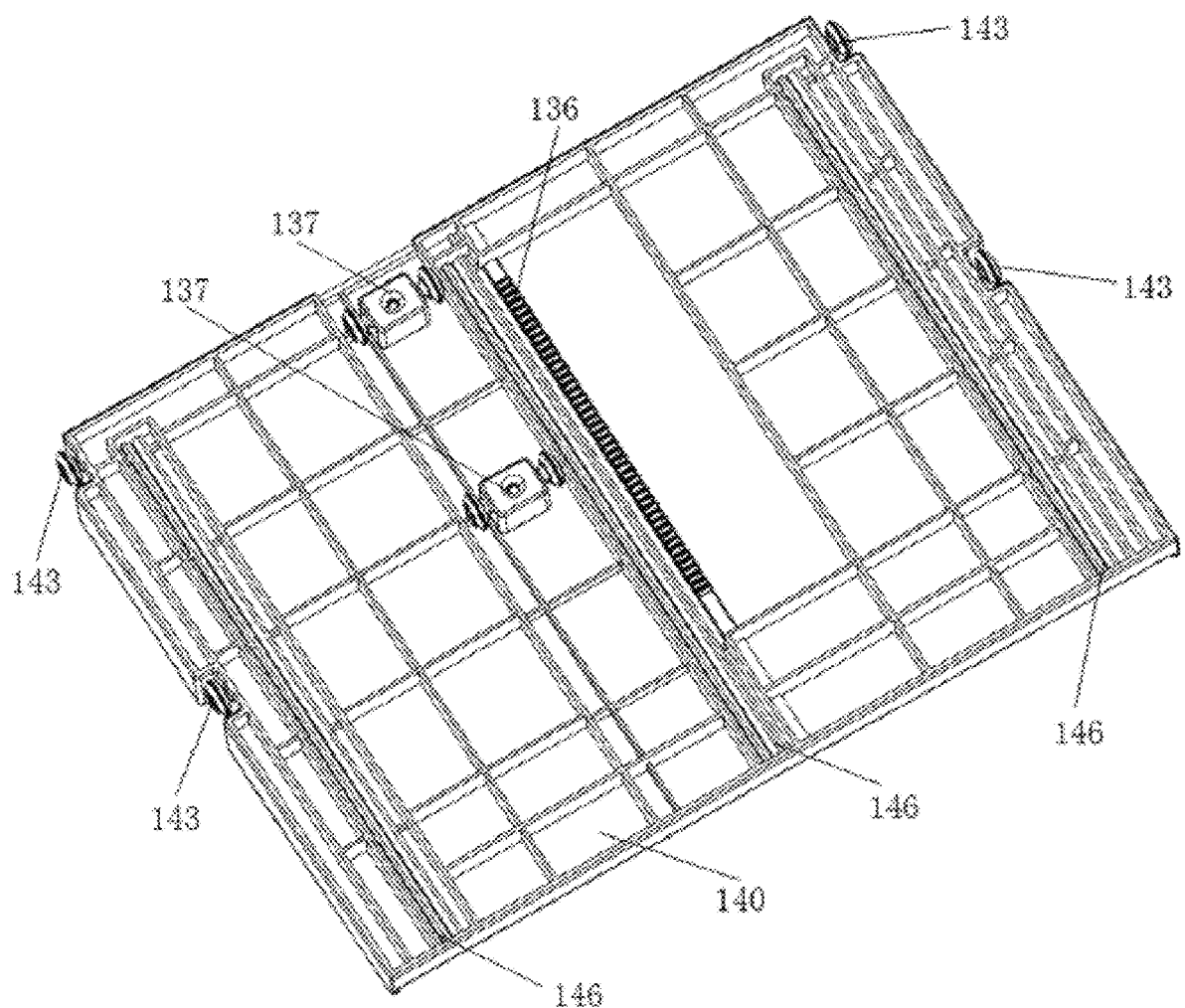
FIG. 10 is a schematic structural view of the loading surface of the pallet provided in Embodiment 2.
Figure 11:
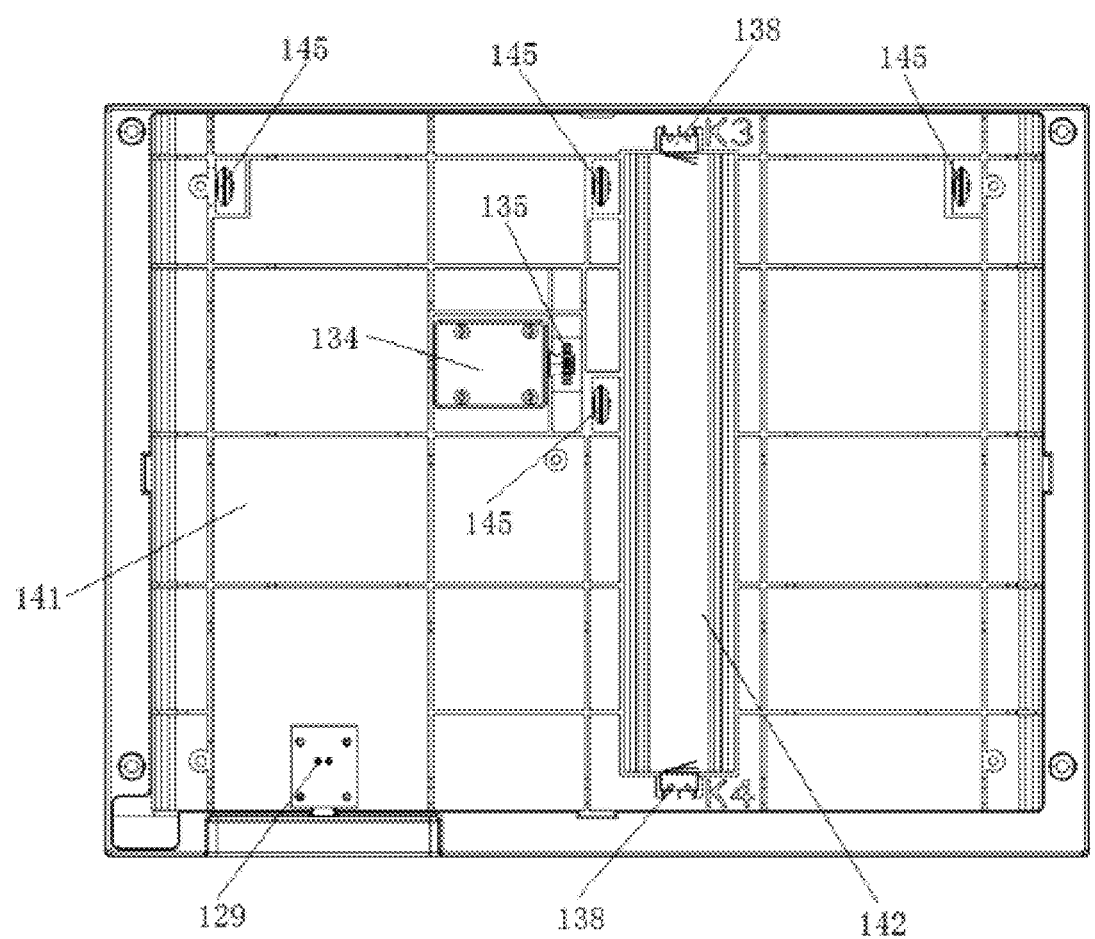
FIG. 11 is a schematic structural diagram of the bottom mounting cavity provided by Embodiment 2.
Figure 12:
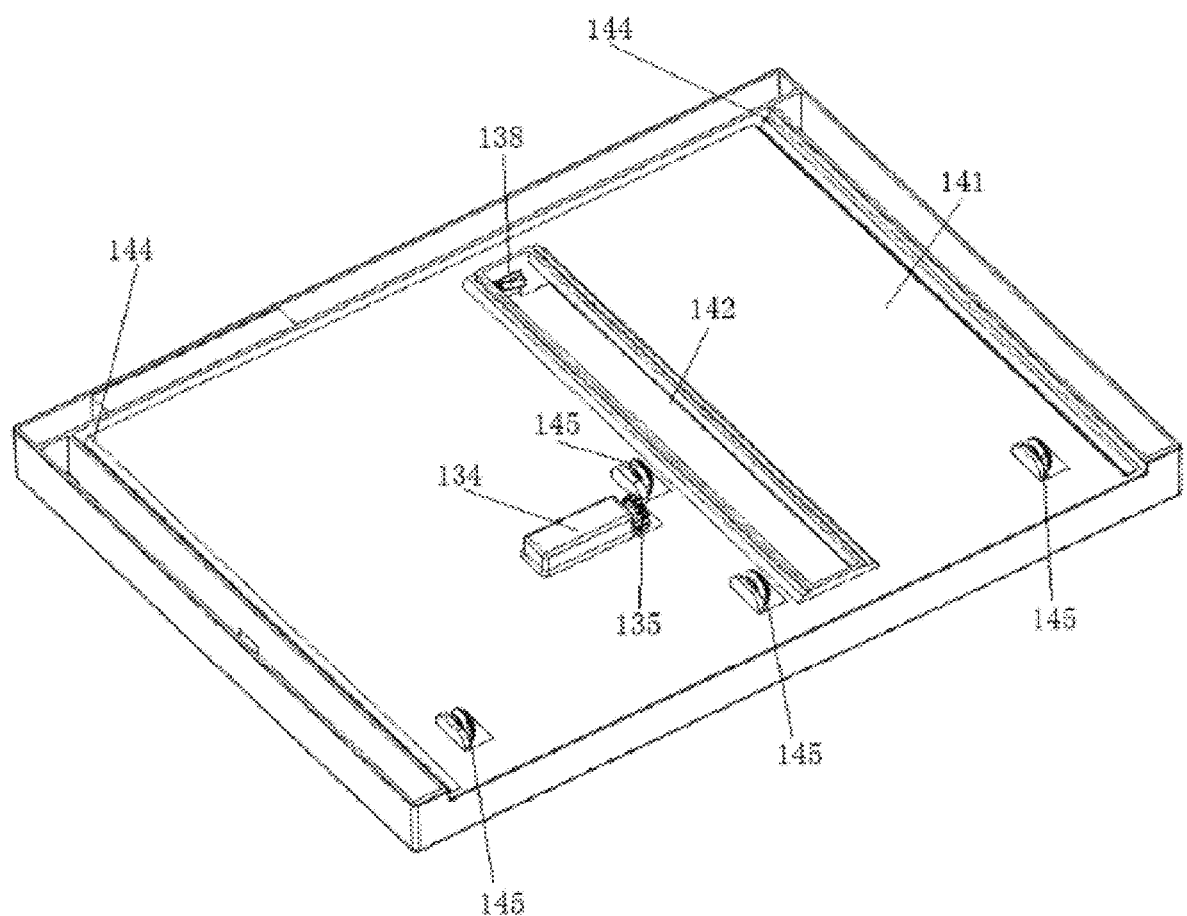
FIG. 12 is a structural schematic view of the bottom mounting cavity provided by Embodiment 2 at another viewing angle.

In order to make the purpose, technical solution and advantages of the present application clearer, the present application will be described in detail below in conjunction with the accompanying drawings and specific embodiments.

Here, it should also be noted that, in order to avoid obscuring the present application due to unnecessary details, only structures and/or processing steps closely related to the solution of the application are shown in the drawings. Other details that are not relevant to the present application have been omitted.

In addition, it should be noted that the terms "including", "comprising" or any other variations thereof are intended to cover a non-exclusive inclusion, such that a process, method, or article comprises a series of elements. Either the apparatus comprises not only those elements, but also other elements not expressly listed, or elements inherent in such a process, method, article, or apparatus.

Embodiment 1

As shown in FIGS. 1-8, a shoe box comprises a box body and a box door 101 configured for closing the box body. The box door 101 has an open state and a closed state. The box body comprises a hollow storage cavity 100, the storage cavity 100 is enclosed by a top plate 102, a bottom plate 122, a rear plate 126 and two side plates 103 arranged between the top plate 102 and the bottom plate 122, and the storage cavity 100 comprises a front opening. The box body also comprises a first driving component configured to drive the box door 101 to be opened or closed, and the first driving component reciprocates along the depth direction of the storage cavity 100. When the box door 101 is in the open state, the box door 101 is accommodated in the storage cavity 100, and the box door 101 is arranged adjacent to and parallel to the top plate 102; when the box door 101 is in the closed state, the box door 101 is perpendicular to the top plate 102 and is stopped by the front opening.

In this embodiment, the top plate 102 comprises a top mounting cavity 112 and an upper cover 123 covering the top mounting cavity 112. A first driving component configured for driving the box door 101 is arranged in the top mounting cavity 112. The first driving component comprises a first reduction motor 113, a first rotating gear 114 and a first gear rack 115. The output of the first reduction motor 113 is connected with the first rotating gear 114, the first reduction motor 113 is surrounded by a first motor housing 125, and the first rotating gear 114 is accommodated in the first motor casing 125. Both sides of the first motor housing 125 are respectively connected with the first pulley block 120, and the top mounting cavity 112 comprises a first cavity surface 118 facing the storage cavity 100, and the first cavity surface 118 is provided with the first pulley block 120 which is slidingly matched with the first cavity surface 118. The first cavity surface 118 is provided with a first chute block 121 that is slidably matched with the first pulley block 120, so that the reciprocating sliding process of the first reduction motor 113 is stable and smooth. The first motor housing 125 is connected to the box door 101 through the rotating shaft component. The top of the first reduction motor 113 is covered with a gear rack plate 124. The first gear rack 115 is arranged on the gear rack plate 124 along the depth direction of the storage cavity 100. The first reduction motor 113 is configured to drive the first rotating gear 114 to mesh with the first gear rack 115 to drive the box door 101 to move.

Figure 13:
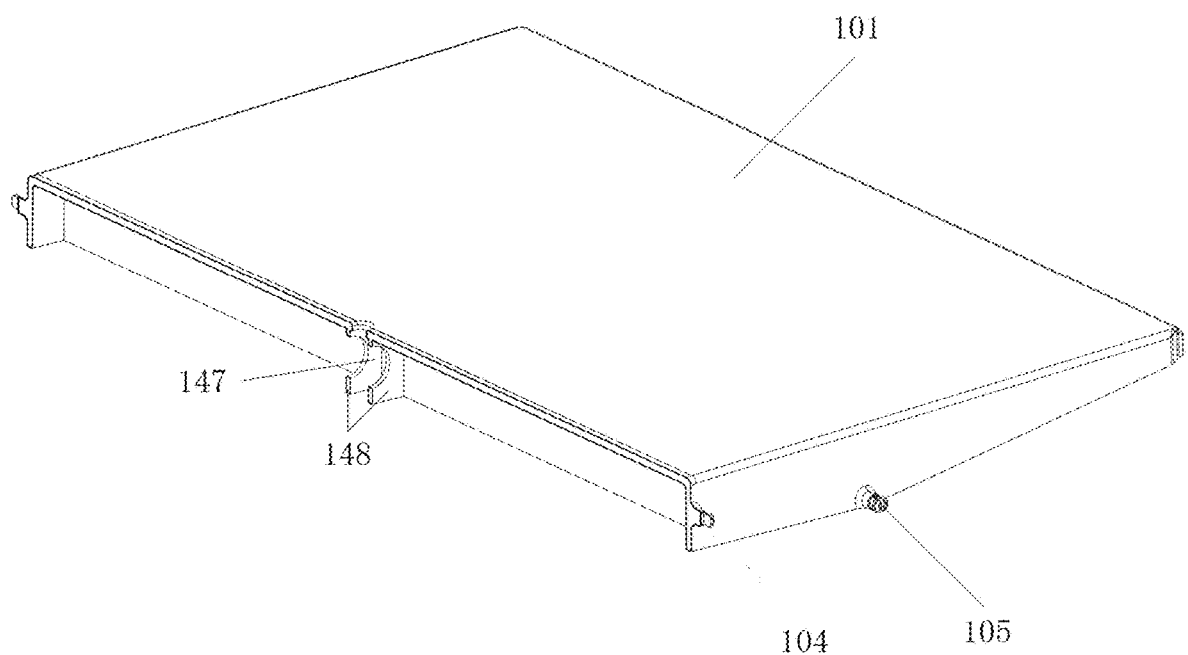
FIG. 13 is a structural schematic perspective view of the box door provided by the present application.

In this embodiment, the rotating shaft component comprises a connecting shaft 116 and a connecting sleeve 117 that fit with each other, and the connecting shaft 116 is arranged perpendicular to the axial direction of the connecting sleeve 117. The connecting shaft 116 is connected to the first motor housing 125. As shown in FIG. 13, the top of the box door 101 is provided with a rotating seat 148 and an escape hole 147, and the connecting sleeve 117 is rotatably matched with the rotating seat 148 so that the box door 101 can be turned around the axis of the connecting sleeve 117. The connecting shaft 116 passes through the escape hole 147 and is inserted and matched with the connecting sleeve 117. A first limiting groove 119 is formed on the first cavity surface 118, and the connecting shaft 116 is slidably matched with the first limiting groove 119.

In this embodiment, first guiding structures are provided on both sides of the box door 101, and second guiding structures are provided on the inner walls of the two side plates 103, and the first guiding structure and the second guiding structure are slidably matched. The first guiding structure comprises a first guiding post 104 and a second guiding post 105, and the second guiding structure comprises a first guide slot 106 and a second guide slot 107 respectively matching the first guiding post 104 and the second guiding post 105. The shape of the first guiding groove 106 is linear, and the second guiding groove 107 comprises a straight groove 108 intersecting with the first guiding groove 106. The outer end of the straight groove 108 is integrally connected with an arc groove 109, and the arc groove 109 is deflected in a direction away from the first guiding groove 107; The first guiding groove 106 is arranged horizontally, and the outer end of the arc groove 109 in the second guiding groove 107 is arranged vertically.

In this embodiment, a first switch component 150 configured for controlling the first driving component is also arranged in the top mounting cavity 112. The first switch component 150 comprises a first trigging member 110 and two first trigging switches 111. The first trigging member 110 extends from one side of the first motor housing 125, and the two first trigging switches 111 are respectively arranged on both ends of the motion path of the first trigging member 110. When the first driving component drives the box door 101 to open or close, the first trigging member 110 triggers a first trigging switch 111 thereof to turn off the first driving component.

In this embodiment, the first switch component 150 further comprises a first control switch (not shown in the figure), when the first trigging member 110 triggers a first trigging switch 111 so that the first driving component is turned off, the first control switch can start the first driving component, so that the first driving component drives the box door 101 to switch from the open state/closed state to the closed state/open state, until the first trigging member 110 triggers another first trigging switch 111 to close the first driving component.

In this embodiment, the bottom plate 122 comprises a bottom mounting cavity 130 and a lower cover 131 covering the bottom mounting cavity 130. A power supply 149 is provided in the top mounting cavity 112, and the power supply 149 is configured for supplying power to the first driving component and the first switch component 150; The upper cover 123 is provided with a groove 127, the groove 127 is provided with metal tabs 128, the bottom mounting cavity 130 is provided with metal joints 129 which can be electrically connected to the metal tabs 128, and the metal joint 129 protrudes from the lower cover 131. The metal tab 128 is electrically connected to the first driving component and the first switch component 150, and the metal joint 131 is electrically connected to the power supply 149. If multiple shoe boxes are stacked, as long as one shoe box is powered on, the other shoe boxes will be powered on.

The working principle of this embodiment is as follows, when the box door 101 is in the closed state, the user activates the first driving component by the first control switch. At this time, the first reduction motor 113 clockwise drives the first rotating gear 114 to mesh with the first gear rack 115, thereby driving the first guiding post 104 and the second guiding post 105 of the box door 101 to move in the first guiding groove 106 and the second guiding groove 107 slides along the direction approaching the storage cavity 100, until the first trigger 110 is abuts against the first trigging switch 111 located deep in the storage cavity 100. The first reduction motor 113 stops rotating, the box door 101 is parallel to the top plate 102 and accommodated in the storage cavity 100, the front opening of the storage cavity 100 is opened, and the box door 101 is in an open state. After the user finishes taking/putting the shoes, start the first driving component again through the first control switch, and now the first reduction motor 113 drives the first rotating gear 114 counterclockwise to mesh with the first gear rack 115 until the first trigging member 110 abuts against the first trigging switch 111 located on the front side of the storage cavity 100, the first reduction motor 113 stops rotating, the box door 101 stops by the front opening, and the box door 101 returns to the closed state.

Embodiment 2

As shown in FIGS. 9-12, a shoe box, compared with Embodiment 1, is different in that it further comprises a supporting plate 133, and the supporting plate 133 comprises a supporting surface 139 and a loading surface 140 arranged opposite to each other. A second driving component and a second switch component configured for controlling the second driving component are provided in the upper mounting cavity 130, the second driving component comprises a second reduction motor 134, a second rotating gear 135 and a second gear rack 136, the second reduction motor 134 is fixedly installed in the bottom mounting cavity 130, and the second gear rack 136 is arranged on the loading surface 140 along the moving direction of the supporting plate 133. The second reduction motor 134 is configured for driving the second rotating gear 135 to engage with the second gear rack 135 to drive the supporting plate 133 to move.

In this embodiment, the second switch component comprises two second trigging members 137 and two second trigging switches 138; the two second triggers 137 are arranged on the loading surface 140 along the moving direction of the supporting plate 133. The bottom mounting cavity 130 comprises a second cavity surface 141 facing the loading surface 140, the second cavity surface 141 is provided with a second limiting groove 142, and two second trigging switches 138 are respectively arranged at both ends of the second limiting groove 142. The two second trigging members 137 are slidingly matched with the second limiting groove 142. When the supporting plate 133 slides into the storage cavity 100, a second trigging member 137 triggers its adjacent second trigging switch 138, and the second driving component is turned off; when the supporting plate 133 slides out of the storage cavity 100, another second trigging member 137 triggers its adjacent second trigging switch 138, and the second driving component is turned off.

In this embodiment, the two sides of the supporting plate 133 are respectively provided with a second pulley block 143, and the second cavity surface 141 is provided with a second chute block 144 matching the second pulley block 133. Third pulley sets 145 are arranged on the second chamber surface 141 at even intervals, which have better support to the supporting plate 133 and improves the load-bearing capacity of the supporting plate 133. Third chute blocks 146 matching with the third pulley blocks 145 are formed on the loading surface 140.

In this embodiment, the first control switch is also configured for controlling the opening and closing of the second driving component. When the box door 101 is in the closed state, the user activates the first driving component and the second driving component through the first control switch, the box door 101 is stored in the storage cavity 100, and the supporting plate 133 protrudes out of the storage cavity 100. After the user finishes taking/putting the shoes, the first driving component and the second driving component are activated again through the first control switch, the supporting plate 133 is retracted into the storage cavity 100, and the box door 101 is stopped outside the storage cavity 100.

The above embodiments are only used to illustrate the technical solutions of the present application without limitation. Although the present application has been described in detail with reference to the preferred embodiments, those of ordinary skill in the art should understand that the technical solutions of the present application can be modified or equivalently replaced, without departing from the spirit and scope of the technical solutions of the present application.

What is claimed is:

1. A shoe box, comprising
   a box body, the box body comprises a hollow storage cavity, the storage cavity comprises a front opening;
   a box door, which is configured to close the box body, and the box door has an open state and a closed state;
   the box body comprises a first driving component configured to drive the box door to be opened or closed, and the first driving component reciprocates along a depth direction of the storage cavity;
   the box door is accommodated in the storage cavity, when the box door is in the open state; the box door is stopped by the front opening, when the box door is in the closed state;
   wherein the box body comprises a first switch component for controlling the first driving component, the box body further comprises a top plate and side plates respectively arranged on both sides of the top plate;
   wherein the top plate comprises a top mounting cavity for mounting the first driving component and the first switch component, the first driving component comprises a first reduction motor, the first reduction motor is connected to an upper end of the box door through a rotating shaft component;
   wherein the rotating shaft component comprises a connecting shaft and a connecting sleeve that fit with each other, the connecting shaft is arranged perpendicular to an axial direction of the connecting sleeve, the connecting shaft is configured for connecting the first reduction motor, the connecting sleeve is rotatably connected to a top end of the box door; the top mounting cavity comprises a first cavity surface facing the storage cavity, and the first cavity surface is provided with a first limiting groove, and the connecting shaft is slidingly matched with the first limiting groove.

2. The shoe box according to claim 1, wherein
   the first switch component comprises a first trigging member and two first trigging switches, wherein when the first driving component drives the box door to be in an open state or a closed state, the first trigging member triggers one of the first trigging switches to close the first driving component;
   and/or the box door comprises a first guiding structure, the box body comprises a second guiding structure, and the first guiding structure is slidingly matched with the second guiding structure.

3. The shoe box according to claim 2, wherein
   the top plate is configured for installing the first driving component and the first switch component, and the first guiding structure is arranged on both sides of the box door, the second guiding structure is arranged on an inner wall of the side plate;
   when the box door is in an open state, the box door is arranged adjacent to and parallel to the top plate; when the box door is in a closed state, the box door is arranged perpendicular to the top plate.

4. The shoe box according to claim 3, wherein
   the first driving component further comprises a first rotating gear and a first gear rack, and the first gear rack is fixedly arranged in the top mounting cavity, and the first reduction motor is configured for driving the first rotating gear to engage with the first gear rack, thereby driving the box door to move;

one side of the first reduction motor extends out of the first trigging member, and the first trigging switches are respectively arranged at two ends of a movement path of the first trigging member.

5. The shoe box according to claim 2, wherein the first guiding structure comprises a first guiding post and a second guiding post, and the second guiding structure comprises a first guiding groove and a second guiding groove respectively matching the first guiding post and the second guiding post;

wherein shape of the first guiding groove is linear, the second guiding groove comprises a straight groove intersecting with the first guiding groove, an outer end of the straight groove is integrally connected with an arc groove, and the arc groove is deflected in a direction away from the first guiding groove; the first guiding groove is arranged horizontally, and an outer end of the arc groove in the second guiding groove is vertically arranged.

6. The shoe box according to claim 1, wherein
the box body further comprises a bottom plate, the bottom plate comprises a bottom mounting cavity, and a power supply is provided in the top mounting cavity and/or the bottom mounting cavity, and the power supply is configured to supply power to the first driving component and the first switch component;
the top plate is provided with a plurality of grooves, the grooves are provided with metal tabs, and metal joints capable of electrically connecting the metal tab are protrudingly arranged on the bottom plate, the metal tabs are electrically connected to the first driving component and the first switch component, and the metal joints are electrically connected to the first switch component.

7. The shoe box according to claim 6, wherein
further comprising a supporting plate, a second driving component and a second switch component for controlling the second driving component are arranged in the bottom mounting cavity, and the second driving component is configured to drive the supporting plate into and out of the storage cavity;
the second driving component comprises a second reduction motor, a second rotating gear and a second gear rack, the second reduction motor is fixedly arranged in the bottom mounting cavity, the second gear rack is arranged on the supporting plate, the second reduction motor is configured to drive the second rotating gear to mesh with the second gear rack to drive the supporting plate to move.

8. The shoe box according to claim 7, wherein the second switch component comprises two second trigging members and two second trigging switches; the supporting plate comprises a supporting surface and a loading surface arranged opposite to each other, and the second gear rack and the two second trigging members are respectively arranged along a moving direction of the supporting on the loading surface, the bottom mounting cavity comprises a second cavity surface facing the loading surface, and the second cavity surface is provided with a second limiting groove, and the two second trigging switches are respectively arranged at both ends of the second limiting groove, and the two second triggering members are slidably matched with the second limiting groove;

when the supporting plate slides into the storage cavity, one of the second trigging members triggers the adjacent second trigging switch, and the second driving component is turned off; when the supporting plate slides out of the storage cavity, another second trigging member triggers the adjacent second trigging switch, and the second driving component is turned off.

9. The shoe box according to claim 8, wherein two sides of the supporting plate are respectively provided with a second pulley block, and the bottom plate is provided with a second chute block matching the second pulley block; and/or the bottom plate is provided with a third pulley block, and the loading surface is provided with a third chute block matching the third pulley block.

* * * * *